United States Patent
Toda et al.

(10) Patent No.: US 9,828,923 B2
(45) Date of Patent: Nov. 28, 2017

(54) CONTROL DEVICE FOR INTERNAL COMBUSTION ENGINE

(71) Applicant: MITSUBISHI JIDOSHA KOGYO KABUSHIKI KAISHA, Tokyo (JP)

(72) Inventors: Hitoshi Toda, Okazaki (JP); Toshiyuki Miyata, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 178 days.

(21) Appl. No.: 14/854,289

(22) Filed: Sep. 15, 2015

(65) Prior Publication Data

US 2016/0090925 A1 Mar. 31, 2016

(30) Foreign Application Priority Data

Sep. 26, 2014 (JP) ................................ 2014-197526

(51) Int. Cl.
| | |
|---|---|
| F02B 33/44 | (2006.01) |
| F02D 41/00 | (2006.01) |
| F02D 41/18 | (2006.01) |
| F02D 23/02 | (2006.01) |
| F02B 33/40 | (2006.01) |

(52) U.S. Cl.
CPC .......... *F02D 41/0007* (2013.01); *F02B 33/40* (2013.01); *F02D 23/02* (2013.01); *F02D 41/18* (2013.01); *F02D 2200/0402* (2013.01); *F02D 2200/0406* (2013.01); *F02D 2200/0414* (2013.01); *Y02T 10/144* (2013.01)

(58) Field of Classification Search
CPC ...... F02D 41/0007; F02D 23/02; F02D 41/18; F02D 2200/0402; F02D 2200/0406; F02B 33/40; Y02T 10/144

USPC ................................................. 60/605.1, 611
See application file for complete search history.

(56) References Cited

U.S. PATENT DOCUMENTS

| | | | |
|---|---|---|---|
| 5,191,789 A | 3/1993 | Furuya | |
| 6,820,595 B2 * | 11/2004 | Kobayashi | F02D 41/1401 123/478 |
| 7,146,964 B2 * | 12/2006 | Norimoto | F02D 41/3035 123/435 |

(Continued)

FOREIGN PATENT DOCUMENTS

| | | |
|---|---|---|
| JP | S58-150040 A | 9/1983 |
| JP | 6-66167 A | 3/1994 |

OTHER PUBLICATIONS

Extended European Search Report dated Feb. 4, 2016 in correspoding European Patent Application No. 15186261.2.

*Primary Examiner* — Thai Ba Trieu
(74) *Attorney, Agent, or Firm* — Birch, Stewart, Kolasch & Birch, LLP

(57) ABSTRACT

A control device for an internal combustion engine, which can accurately estimate an intake air amount introduced from an intake system into an internal combustion engine, is provided. The control device calculates the change amount of an air amount in an upstream section upstream of a throttle valve of the intake system based on the pressure and temperature of air in the upstream section; calculates a throttle passage air amount flowing out to an intake manifold, which is a section downstream of the throttle valve, based on the change amount and an introduced air amount flowing into a supercharger; and calculates the intake air amount based on the throttle passage air amount.

2 Claims, 2 Drawing Sheets

(56) References Cited

U.S. PATENT DOCUMENTS

| | | | | |
|---|---|---|---|---|
| 7,163,007 B2* | 1/2007 | Sasaki | ................ | F02D 41/0007 |
| | | | | 123/480 |
| 7,331,317 B2* | 2/2008 | Yasui | ................ | F02B 29/0412 |
| | | | | 123/347 |
| 7,886,524 B2* | 2/2011 | van Nieuwstadt | .. | F02D 41/0065 |
| | | | | 60/286 |
| 7,913,674 B2* | 3/2011 | Tsuda | ..................... | F02D 9/02 |
| | | | | 701/108 |
| 8,560,204 B2* | 10/2013 | Simon, Jr. | ............... | F02D 13/06 |
| | | | | 701/102 |
| 9,080,528 B2* | 7/2015 | Aoyagi | ................ | F02D 41/146 |
| 2005/0114011 A1* | 5/2005 | Itoyama | ................ | F02D 23/02 |
| | | | | 701/108 |
| 2010/0131212 A1 | 5/2010 | Heinkele et al. | | |
| 2016/0084150 A1* | 3/2016 | Kawabe | ................ | F02B 33/40 |
| | | | | 123/294 |
| 2016/0090927 A1* | 3/2016 | Kawabe | ............. | F02D 41/0007 |
| | | | | 123/294 |
| 2016/0123268 A1* | 5/2016 | Kawabe | ............. | F02D 41/0007 |
| | | | | 123/478 |

* cited by examiner

CONTROL DEVICE FOR INTERNAL COMBUSTION ENGINE

The entire disclosure of Japanese Patent Application No. 2014-197526 filed on Sep. 26, 2014 is expressly incorporated by reference herein.

TECHNICAL FIELD

This invention relates to a control device for an internal combustion engine which can accurately estimate the amount of air in calculating the air-fuel ratio of fuel which is introduced into the internal combustion engine.

BACKGROUND ART

Technologies, which accurately grasp the amount of air taken into a combustion chamber of an internal combustion engine (this amount of air will hereinafter be referred to simply as "intake air amount") to control the internal combustion engine appropriately, have been widely known. It is difficult, however, to detect the intake air amount directly. Thus, a method, which detects the flow rate of air in an intake system of the internal combustion engine by means of an air flow sensor and estimates an intake air amount based on the results of detection, is in general use.

In an internal combustion engine having connected thereto an intake system equipped, from upstream to downstream, with a supercharger, an intercooler, a throttle valve, and an intake manifold, for example, the intake air amount is calculated during non-supercharging and during supercharging. With such an intake system, the amount of air on a side upstream of the throttle valve changes according to a change in a boost pressure by the supercharger. Thus, the amount of air found by the air flow sensor is corrected based on the volume of a supercharged chamber upstream of the throttle valve (see, for example, Patent Document 1).

The intake air amount is required to be detected or estimated with a higher accuracy, but it is hard to say that the technology described in Patent Document 1 is fully accurate.

Depending on operating situations, moreover, air may flow reversely from the supercharger toward its upstream side. In this case, the air flow sensor installed upstream of the supercharger poses the problems of detecting the amount of air excessively and lowering the accuracy of the estimated value of the intake air amount based on the excessive air amount.

PRIOR ART DOCUMENTS

Patent Documents

[Patent Document 1] JP-A-Hei-6-66167

SUMMARY OF THE INVENTION

Problems to be Solved by the Invention

The present invention has been accomplished in the light of the above-described circumstances. It is an object of this invention to provide a control device for an internal combustion engine, which can accurately estimate the amount of intake air introduced from an intake system into the internal combustion engine.

Means for Solving the Problems

A control device according to at least one embodiment of the present invention is a control device for an internal combustion engine equipped with a supercharger and a throttle valve disposed downstream of the supercharger, the control device comprising a calculation unit which, based on the pressure and temperature of an upstream section between a site upstream of the throttle valve and a site downstream of the supercharger, calculates an amount of change in the amount of air in the upstream section, and calculates a throttle passage air amount having passed through the throttle valve from a difference between an introduced air amount introduced into the supercharger and the amount of change.

Effects of the Invention

According to the present invention, there is provided a control device for an internal combustion engine, which can accurately estimate the amount of intake air introduced from the intake system into the internal combustion engine.

MODE FOR CARRYING OUT THE INVENTION

Embodiments of the present invention will now be described with reference to the accompanying drawings. The descriptions of the embodiments are illustrative, and the present invention is in no way limited to the descriptions offered below.

<Embodiment>1

Figure 1:
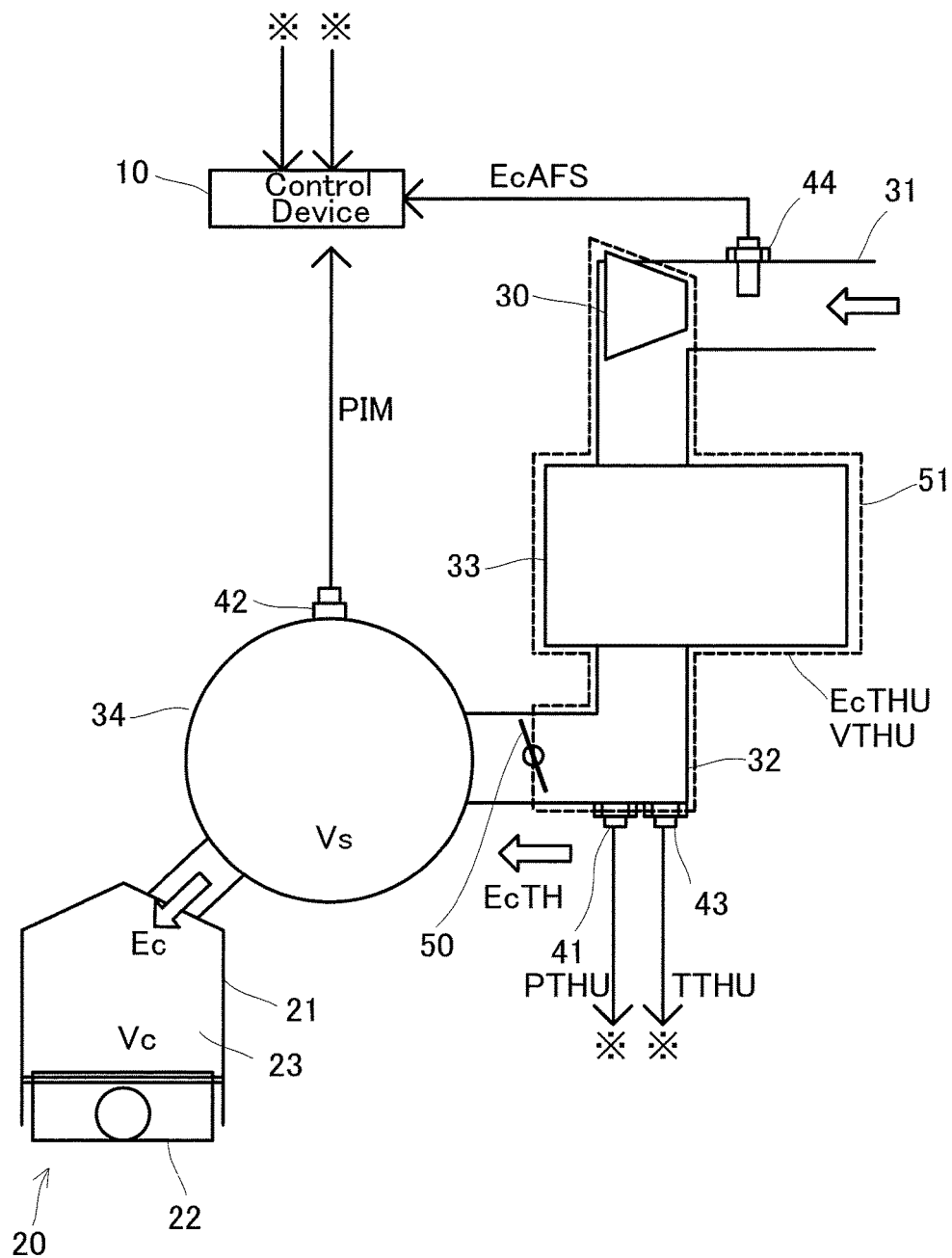
[FIG. 1] is a schematic configuration diagram of an intake system, an internal combustion engine and a control device according to embodiments of the present invention.

FIG. 1 is a schematic configuration diagram of an intake system, an internal combustion engine and a control device according to the present embodiment. A control device 10 of the present embodiment is applied to an internal combustion engine loaded on a vehicle. Here, one of a plurality of cylinders provided in a multi-cylinder internal combustion engine 20 is shown. A piston 22 is provided interiorly to be reciprocatingly slidable along the inner peripheral surface of a cylinder 21 formed in a hollow cylindrical shape. A space surrounded with the upper surface of the piston 22, the inner peripheral surface of the cylinder 21, and the top surface of the cylinder 21 (i.e., interior of cylinder) functions as a combustion chamber 23 of the internal combustion engine. The volume of the combustion chamber 23 is designated as Vc.

A lower part of the piston 22 is coupled via a connecting rod (not shown) to a crank arm having a central axis eccentric with respect to the shaft center of a crankshaft, although this is not illustrated. By so doing, the reciprocating motion of the piston 22 is transmitted to the crank arm, and converted into a rotating movement of the crankshaft.

In the top surface of the cylinder 21, an intake port and an exhaust port (not shown) are bored. The intake port is an opening for supplying intake air into the combustion chamber 23, while the exhaust port is an opening for discharging an exhaust after combustion within the combustion chamber 23. The intake port and the exhaust port are provided with an intake valve and an exhaust valve (not shown), respectively. The intake valve and the exhaust valve having their actions controlled individually. A top part of the cylinder 21 is provided with a spark plug (not shown), whose leading end protrudes toward the combustion chamber 23. The timing of ignition by the spark plug is controlled by the control device 10. In the intake port, an injector (not shown) for injecting fuel is provided. The amount of fuel injected from the injector is controlled by the control device 10 to be described later.

The intake system of the present embodiment is equipped with first piping 31, second piping 32, an intercooler 33, and an intake manifold 34. The first piping 31 is piping for guiding air, which has been incorporated from the outside of the vehicle, to the intercooler 33. The second piping 32 is piping for guiding air, which has been discharged from the intercooler 33, to the intake manifold 34. The intake manifold 34 is formed to be branched toward the combustion chambers 23 (intake ports) of the respective cylinders 21.

A supercharger 30 is disposed in the first piping 31, and an air flow sensor 44 (flow meter) is arranged upstream of the supercharger 30. The air flow sensor 44 is a device for measuring the amount of air having passed on the side upstream of the supercharger 30. The amount of passing air or passage air amount, measured with the air flow sensor 44, is called an introduced air amount or EcAFS.

A throttle valve 50 is disposed in the second piping 32, and can be allowed by the control device 10 to adjust the second piping 32 with an arbitrary opening ranging from a fully closed state to a fully open state. At a site of the second piping 32 upstream of the throttle valve 50, a first pressure sensor 41 and a temperature sensor 43 are arranged.

The first pressure sensor 41 detects the pressure of air present upstream of the throttle valve 50, but downstream of the supercharger 30 and the intercooler 33, and the detected pressure is also designated as PTHU.

The temperature sensor 43 detects the temperature of air present upstream of the throttle valve 50, but downstream of the supercharger 30 and the intercooler 33, and the detected temperature is also designated as TTHU.

A second pressure sensor 42 is disposed in the intake manifold 34. The second pressure sensor 42 detects the pressure of air inside the intake manifold 34, and the detected pressure is also designated as PIM. The volume of the intake manifold 34 is termed Vs.

In connection with the above-described intake system, the supercharger 30, a part of the first piping 31 downstream of the supercharger 30, the intercooler 33, and a part of the second piping 32 ranging from the intercooler 33 to the throttle valve 50, which are located upstream of the throttle valve 50, are collectively called an upstream section 51. The intake manifold 34 located downstream of the throttle valve 50 is a part corresponding to a downstream section as referred to in the claims of the present application.

The amount of air flowing out from the outlet of the upstream section, namely, the throttle valve 50, toward the intake manifold 34, the downstream section, is designated as a throttle passage air amount or EcTH. The flow rate of air introduced from the intake manifold 34 into the combustion chamber 23 is designated as an intake air amount or Ec.

The vehicle loaded with the intake system and the internal combustion engine 20 described above is provided with the control device 10. The control device 10 is constituted, for example, as an LSI device or a built-in electronic device having microprocessors, ROM, RAM, etc. integrated thereinto, and is connected to a communication line of an in-vehicle network provided in the vehicle. On the in-vehicle network, various publicly known electronic control devices are intercommunicably connected, such as a brake control device, a transmission control device, a vehicle stability control device, an air-conditioning control device, and an electric equipment control device.

The control device 10 is an electronic control device for comprehensively controlling a wide variety of systems concerned with the internal combustion engine 20, such as an ignition system, a fuel system, intake and exhaust systems, and a valve system. The control device 10 controls the air amount and the fuel injection amount supplied to each combustion chamber 23 of the internal combustion engine 20, the ignition timing of each combustion chamber 23, and so forth.

The control device 10 also receives inputs, as data, of the introduced air amount (EcAFS) detected by the above-mentioned air flow sensor 44, the pressures (PTHU and PIM) detected by the first pressure sensor 41 and the second pressure sensor 42, respectively, and the temperature (TTHU) detected by the temperature sensor 43. Furthermore, the control device 10 has the volume of the intake manifold 34 (Vs) and the volume of the combustion chamber 23 (Vc) preset in non-volatile memories or the like.

The control device 10 mentioned above calculates the intake air amount based on the data sent from the above-mentioned various sensors, and exercises control so that fuel is combusted at a predetermined air-fuel ratio in the combustion chamber 23. Such a calculation of the intake air amount may be performed by an electronic circuit (hardware) or by software. Alternatively, a part of the calculation of the intake air amount may be made by hardware, and the other part thereof may be carried out by software. This calculation of the intake air amount will be explained below.

When a series of calculations for computing the intake air amount from various data is taken as one computation cycle, the intake air amount calculated at an nth computation cycle is written as Ec(n). In regard to other parameters as well, the value by the nth computation cycle is written with (n) added.

First of all, the amount of change in (or change amount of) the air amount in the upstream section 51 will be calculated.

The introduced air amount EcAFS flowing into the upstream section 51 is detected by the air flow sensor 44. On the other hand, the flow rate of air flowing out of the upstream section 51, namely, the throttle passage air amount of air flowing out from the throttle valve 50 into the intake manifold 34 (downstream section), is EcTH.

If the difference between the introduced air amount EcAFS and the throttle passage air amount EcTH is zero, this fact means that the amount of air flowing into the upstream section 51 and the amount of air flowing out of the upstream section 51 are equal. Thus, no change in the pressure of the upstream section 51 occurs. If there is a difference between the introduced air amount EcAFS and the throttle passage air amount EcTH, it appears as a change in the pressure of air inside the upstream section 51. This relationship concerned with the amount of air in the upstream section 51 is represented by Equation 1, which can be rewritten as Equation 2 and Equation 3.

[Mathematical 1]

$$EcTHU(n-1)+EcAFS(n)-EcTH(n)=EcTHU(n) \quad \text{(Equation 1)}$$

$$EcTH(n)=EcAFS(n)-\{EcTHU(n)-EcTHU(n-1)\} \quad \text{(Equation 2)}$$

$$EcTH(n)=EcAFS(n)-\delta \quad \text{(Equation 3)}$$

As indicated by Equation 1, the air amount of the upstream section 51 in the computation cycle executed this time (nth), i.e., EcTHU(n), is obtained by adding the difference between EcAFS (n) and EcTH(n) to EcTHU(n−1)

which is the air amount of the upstream section 51 in the previous ((n−1) th) computation cycle.

When the change of the current air amount relative to the previous air amount of the upstream section 51, namely, the change amount of EcTHU(n) relative to EcTHU(n−1), is taken as δ, this change amount δ can be expressed based on temperature and pressure as parameters from a gas state equation, and thus can be expressed as by Equation 4.

[Mathematical 2] (Equation 4)

$$\delta = \frac{\left\{\frac{PTHU(n)}{TTHU(n)} - \frac{PTHU(n-1)}{TTHU(n-1)}\right\} \times \frac{VTHU}{R}}{Vc \times \rho} \times 100$$

In the equation, ρ represents an air density in the normal state, VTHU represents the volume of the upstream section 51, and R represents a gas constant.

Using Equation 4, the control device 10 calculates the change amount δ of the air amount in the upstream section 51 based on the previous values of the pressure and temperature of air in the upstream section 51 (i.e., PTHU(n−1), TTHU(n−1)) and their current values (PTHU(n), TTHU(n)).

Then, the control device 10 calculates the throttle passage air amount EcTH(n) based on the change amount 5 and the introduced air amount EcAFS(n) flowed into the upstream section 51 (supercharger 30) by use of Equations 3 and 4.

Then, the control device 10 calculates Ec(n), which is the intake air amount in the current computation cycle (i.e., current value), based on the throttle passage air amount EcTH(n) and Ec(n−1) which is the intake air amount found in the previous computation cycle (i.e., previous value). Concretely, the control device 10 calculates Ec(n) using Equation 5.

[Mathematical 3] (Equation 5)

$$Ec(n) =$$

$$\frac{Kmap(n)}{Kmap(n-1)} \times \frac{Vs}{Vs + Vc \times Kmap(n)} \times Ec(n-1) +$$

$$\left\{1 - \frac{Vs}{Vs + Vc + Kmap(n)}\right\} \times EcTH(n)$$

According to the above computations, the ratio of the current value of volumetric efficiency factor, Kmap(n), to the value of volumetric efficiency factor in the previous computation cycle (i.e., Kmap(n−1)) is used as one of factors by which the intake air amount Ec(n−1) obtained in the previous computation cycle is multiplied. The volumetric efficiency factor can be calculated by a publicly known method.

In this manner, the control device 10 calculates the current (n-th) intake air amount Ec(n). Using the so calculated intake air amount Ec(n), the control device 10 controls the injection amount of fuel so that fuel is burned at a predetermined air-fuel ratio in the combustion chamber 23.

The control device 10 according to the present embodiment, as described above, uses the throttle passage air amount EcTH in calculating the intake air amount (Equation 5). The throttle passage air amount EcTH is calculated based on the pressure and temperature of air in the upstream section 51 (Equation 3, Equation 4).

Depending on the opening of the throttle valve 50, the throttle passage air amount EcTH fluctuates. However, the throttle passage air amount EcTH can be calculated by making its calculation based on the pressure and temperature of air in the upstream section 51. That is, a more accurate throttle passage air amount EcTH conformed to the opening of the throttle valve 50 can be calculated.

Since the throttle passage air amount EcTH can be calculated more accurately as above, the intake air amount Ec obtained from the throttle passage air amount EcTH can be calculated more accurately.

Conventionally, the intake air amount has been calculated on the assumption that the throttle valve 50 is fully open. In this case, the intake air amount has been calculated, provided that during non-supercharging, the throttle passage air amount EcTH and the introduced air amount EcAFS are the same. During supercharging, it has been assumed that pressures are the same in the upstream section 51 upstream of the throttle valve 50 and in the intake manifold 34 (downstream section) downstream of the throttle valve 50. On this assumption, a primary delay calculation has been made, with a section ranging from the combustion chamber 23 to the air flow sensor 44 being taken to occupy one volume, whereby the intake air amount has been calculated.

Depending on the operating status, the opening of the throttle valve 50 can be any opening between full openness and full closeness. The conventional calculation assuming that the throttle valve 50 is fully open, therefore, cannot provide an accurate value of the intake air amount.

The control device 10 according to the present embodiment, by contrast, can calculate a more accurate throttle passage air amount EcTH conformed to the opening of the throttle valve 50. Thus, the intake air amount Ec finally obtained can be rendered more accurate. Since fuel can be burned at an air-fuel ratio adjusted based on the resulting intake air amount Ec, the internal combustion engine can be allowed to work more efficiently.

A method is conceivable which comprises mounting an air flow sensor upstream of the throttle valve 50, instead of mounting the air flow sensor 44 upstream of the supercharger 30, thereby measuring the throttle passage air amount EcTH, rather than calculating it. However, pulsations of intake air are many, and the amount of a reverse flow is also measured, thus deteriorating the measurement accuracy.

<Embodiment>2

The present embodiment explains a control device which, when air flows reversely from the supercharger 30 to its upstream side, detects this reverse flow of air and can calculate the amount of intake air more accurately.

The control device 10 according to the present embodiment detects that air has flowed reversely from the supercharger 30 to its upstream side, and executes calculation of the intake air amount upon detection of the reverse flow. The configurations and functions of this control device 10, other than those mentioned above, are the same as in the control device 10 according to Embodiment 1, and duplicate explanations for these other configurations and functions are omitted herein.

FIGS. 2A to 2D are graphs chronologically showing the introduced air amount, the intake air amount, the pressures of the first pressure sensor and the second pressure sensor, and the air-fuel ratio.

Figure 2A:
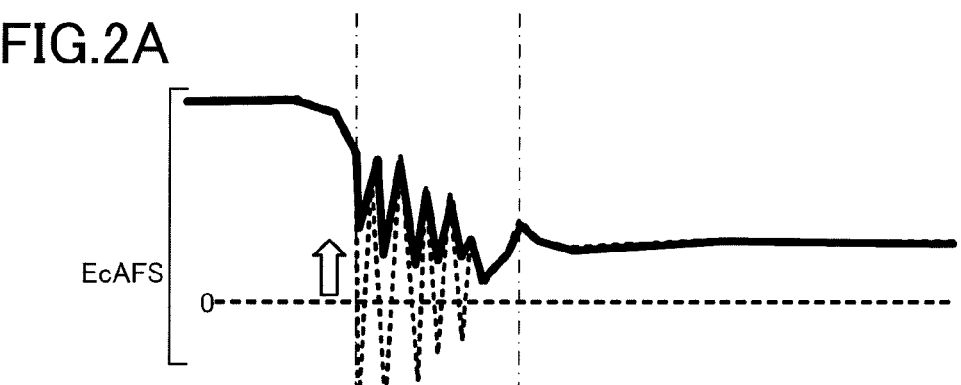
[FIGS. 2A to 2D] are graphs showing an introduced air amount, an intake air amount, pressures of a first pressure sensor and a second pressure sensor, and an air-fuel ratio over time.
Figure 2B:
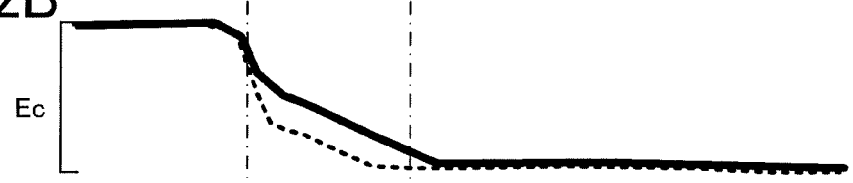
Figure 2C:
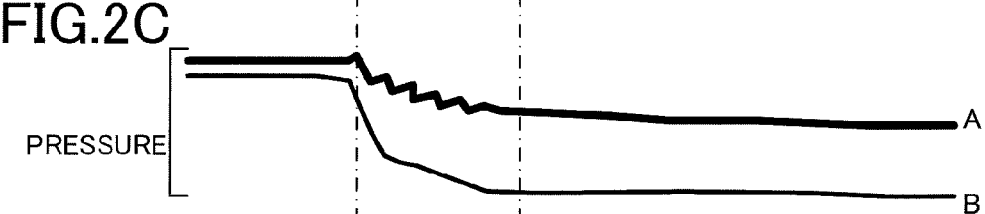
Figure 2D:
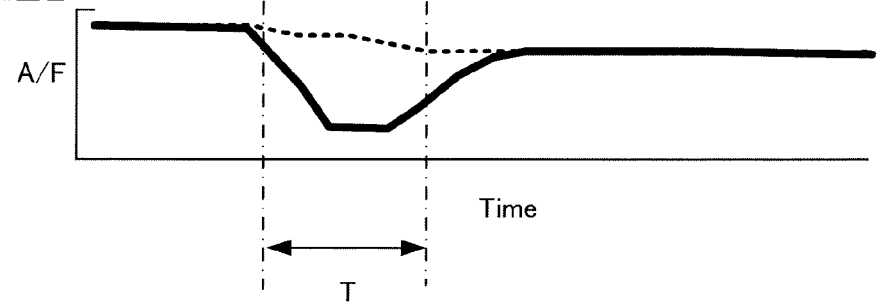

The vertical axis of FIG. 2A represents the introduced air amount EcAFS, the vertical axis of FIG. 2B represents the intake air amount Ec, the vertical axis of FIG. 2C represents the value of pressure, and the vertical axis of FIG. 2D represents the air-fuel ratio (A/F). The horizontal axes of FIGS. 2A to 2D represent time, provided that a reverse flow of air occurs in a time section T from the supercharger 30 toward its upstream side.

As shown in FIG. 2A, if the air flow sensor 44 is configured not to be capable of detecting a reverse flow, the introduced air amount EcAFS will include the flow rate of air flowed reversely, in addition to the amount of air introduced into the supercharger 30. In detail, the introduced air amount EcAFS should essentially be detected in an amount obtained by subtracting the amount corresponding to the reverse flow, as indicated by dashed lines. In fact, however, the introduced air amount EcAFS is detected in an amount larger than the actual amount, as indicated by solid lines.

A dashed line in FIG. 2B represents the actual intake air amount Ec. However, the introduced air amount EcAFS is estimated to be rather higher than its actual value and, if this higher value is used unchanged to calculate the intake air amount Ec, then a higher value than the actual intake air amount Ec indicated by the dashed line is obtained, as indicated by a solid line.

A solid line in FIG. 2D represents the air-fuel ratio calculated based on the intake air amount Ec estimated at the higher value than the actual value (i.e., the solid line in FIG. 2B). Since the intake air amount Ec is estimated to be larger than the actual amount, the air-fuel ratio is adjusted to a lower value in the time section T.

As noted above, when the air flow sensor 44 cannot detect the introduced air amount EcAFS including a reverse flow, the intake air amount Ec obtained based on such an introduced air amount EcAFS deviates from the actual value. Nor is the air-fuel ratio appropriate any more.

Thus, when detecting a reverse flow from the supercharger 30, the control device 10 according to the present embodiment calculates the intake air amount Ec not from Equations 1 to 5 shown in Embodiment 1, but based on the pressure PIM of the intake manifold 34. Concretely, the ratio between the pressure PIM(n) of the intake manifold 34 and the atmospheric pressure acquired by the air flow sensor 44 or the ECU is multiplied by the volumetric efficiency factor Kmap(n) to obtain the intake air amount Ec(n) (see Equation 6). The atmospheric pressure correction factor and the intake correction factor in this equation are preset, for example, in the memory of the control device 10.

[Mathematical 4] (Equation 6)

$$Ec(n) = Kmap(n) \times \frac{PIM(n)}{\text{atmospheric pressure}} \times$$
$$\text{atmospheric pressure correction factor} \times$$
$$\text{intake correction factor}$$

A thick solid line A in FIG. 2C represents the pressure value (PTHU) detected by the first pressure sensor 41, while a thin solid line B in FIG. 2C represents the pressure value (PIM) detected by the second pressure sensor 42.

In the time section T, the solid line A fluctuates. That is, when air flows reversely from the supercharger 30 to its upstream side toward the air flow sensor 44, the pressure value PTHU shows changes. On condition that changes in the pressure value PTHU have been detected, the control device 10 determines that air flows reversely from the supercharger 30 to its upstream side.

Concrete conditions for the detection of changes in the pressure value (PTHU) of the first pressure sensor 41 include, for example, the following: The number of times that the derivative value of the pressure value PTHU has shifted from a positive value to a negative value is counted. If the counted number reaches a predetermined number within a certain period of time, it is determined that the pressure value PTHU has changed. It goes without saying that changes in the pressure value PTHU may be determined under other conditions than the above conditions.

When it is determined that a reverse flow occurs, the intake air amount is calculated based on the pressure of the intake manifold 34. Concretely, the actual intake air amount Ec indicated by the dashed line in FIG. 2B and the pressure PIM of the intake manifold 34 indicated by the solid line B in FIG. 2C are found to be correlated. Thus, the pressure PIM of the intake manifold 34 is multiplied by a coefficient, whereby the intake air amount Ec is obtained. Such a coefficient can be determined beforehand by actual measurements.

As seen above, in the time section T, the actual intake amount Ec as indicated by the dashed line in FIG. 2B is calculated based on the pressure PIM of the intake manifold 34 (FIG. 2C, solid line B). By calculating the air-fuel ratio with the use of the intake air amount Ec based on the pressure PIM, the correct intake air amount Ec can be calculated without the influence of a reverse flow from the supercharger 30 as indicated by the dashed line in FIG. 2B.

As mentioned above, even if the air flow sensor 44 is configured to be incapable of reflecting the amount corresponding to the reverse flow of air from the supercharger 30, the control device 10 according to the present embodiment detects that reverse flow, and calculates the intake air amount Ec without using the introduced air amount EcAFS. This intake air amount Ec is obtained based on the pressure value PIM correlated therewith. Thus, such intake air amount Ec has higher accuracy than that of the intake air amount Ec which has been obtained using the introduced air amount EcAFS estimated at a higher value including the amount corresponding to the reverse flow of air.

As described above, the control device 10 according to the present embodiment calculates the intake air amount Ec accurately in the same manner as in Embodiment 1 when no reverse flow from the supercharger 30 occurs, but calculates the intake air amount Ec accurately based on the pressure value of the intake manifold 34 when a reverse flow from the supercharger 30 occurs. As noted here, the control device 10 according to the present embodiment can calculate the intake air amount Ec accurately even when a reverse flow occurs from the supercharger 30.

When it is determined that no reverse flow has occurred, the intake air amount Ec is calculated based on the throttle passage air amount EcTH and the introduced air amount EcAFS in the same manner as in Embodiment 1.

Other Embodiments

The foregoing Embodiments 1 and 2 have the intercooler 33 included in the intake system, but the present invention is not limited to such embodiments. It suffices for the intake system to include at least a supercharger and a throttle valve.

The pressure and temperature of air in the upstream section 51 are obtained by the first pressure sensor 41 and the temperature sensor 43, but the present invention is not necessarily limited to the use of values obtained by sensors. For example, values estimated by publicly known methods may be used as the pressure and temperature of air in the upstream section 51.

Furthermore, calculations are made, with the side upstream of the throttle valve 50 accounting for a single volume as the upstream section 51, but the present invention is not limited to such an embodiment. For example, the intake air amount Ec may be calculated, with the upstream section 51 being finely divided into a plurality of portions. The configuration of Embodiment 1, for example, may be finely divided into three portions, i.e., the portion ranging from the supercharger to a site directly in front of the intercooler, the intercooler, the portion ranging from the outlet of the intercooler to the throttle valve, for the purpose of calculating the intake air amount Ec.

The control device according to at least one embodiment of the present invention is a control device for an internal combustion engine equipped with a supercharger and a throttle valve disposed downstream of the supercharger, the control device comprising a calculation unit which, based on the pressure and temperature of an upstream section between a site upstream of the throttle valve and a site downstream of the supercharger, calculates a change amount of an air amount in the upstream section, and calculates a throttle passage air amount having passed through the throttle valve from a difference between an introduced air amount introduced into the supercharger and the change amount.

According to this feature, a more accurate throttle passage air amount conformed to the throttle valve can be calculated. Thus, a finally obtained intake air amount can be rendered more accurate. Moreover, fuel can be burned at an air-fuel ratio adjusted based on this intake air amount. Hence, the internal combustion engine can be allowed to act more efficiently.

Moreover, the throttle passage air amount is calculated based on the pressure and temperature of air in the upstream section. Thus, the control device of the present invention can calculate the intake air amount by adapting flexibly to even an intake system including a supercharger of any varied form.

A second embodiment of the present invention is the control device for an internal combustion engine according to the first embodiment, wherein further comprising a first pressure sensor for detecting the pressure of the upstream section, and a temperature sensor for detecting the temperature of air flowing through the upstream section, and the calculation unit calculates the change amount by use of the pressure and the temperature obtained by the pressure sensor and the temperature sensor, and calculates the throttle passage air amount from the difference between the introduced air amount and the change amount.

According to the above second embodiment, the pressure and temperature of air in the upstream section can be detected more accurately and, since the pressure and the temperature are used, the intake air amount can be calculated more accurately.

A third embodiment of the present invention is the control device for an internal combustion engine according to the first or second embodiment, wherein the calculation unit determines a normal flow, which is a flow of air from a side of a flow meter provided upstream of the supercharger for detecting the introduced air amount to the supercharger, and a reverse flow, which is a flow of air from the supercharger to the side of the flow meter, from a change in a pressure value of the first pressure sensor and, when determining that there is no reverse flow, calculates an intake air amount taken into a cylinder of the internal combustion engine based on the throttle passage air amount, but when determining that there is a reverse flow, calculates the intake air amount based on a pressure of air in a downstream section located downstream of the throttle valve.

According to the third embodiment described above, even when a reverse flow occurs from the supercharger, the intake air amount can be calculated.

A fourth embodiment of the present invention is the control device for an internal combustion engine according to the third embodiment, further comprising a second pressure sensor for detecting the pressure of air downstream of the throttle valve, wherein the calculation unit calculates the intake air amount based on a pressure value detected by the second pressure sensor from the introduced air amount, and a volumetric efficiency factor.

According to the fourth embodiment, even when a reverse flow occurs from the supercharger, the intake air amount can be calculated accurately.

INDUSTRIAL APPLICABILITY

The present invention can be utilized in the industrial field of automobiles.

EXPLANATIONS OF LETTERS OR NUMERALS

10 Control device
20 Internal combustion engine
23 Combustion chamber
30 Supercharger
33 Intercooler
34 Intake manifold (downstream section)
41 First pressure sensor
42 Second pressure sensor
43 Temperature sensor
44 Air flow sensor
51 Upstream section

The invention claimed is:

1. An internal combustion engine having a supercharger, comprising:
   a throttle valve disposed downstream of the supercharger;
   a first pressure sensor that detects a pressure of an upstream section between a site upstream of the throttle valve and a site downstream of the supercharger;
   a second pressure sensor that detects a pressure of air downstream of the throttle valve;
   a temperature sensor that detects a temperature of air flowing through the upstream section;
   an air flow sensor that detects an air amount introduced into the supercharger; and
   an electronic controller having executable instructions stored in a non-transitory memory to:
   calculate a change amount of an air amount in the upstream section, based on the detected pressure and the detected temperature of the upstream section of the throttle valve;
   calculate a throttle passage air amount having passed through the throttle valve from a difference between the detected air amount and the calculated change amount of the air amount in the upstream section; and
   calculate an intake air amount from a downstream section located downstream of the throttle valve to a combustion chamber of the internal combustion engine, based on at least one of
     the pressure detected by the second pressure sensor, an atmospheric pressure, and a volumetric efficiency factor in a computation cycle; and
     a throttle passage air amount in a current computation cycle and the intake air amount in a previous computation cycle.

2. The internal combustion engine according to claim 1, wherein the electronic controller further comprising:

the executable instructions stored in a non-transitory memory to:
determine a normal flow, which is a flow of air from a side of the air flow sensor provided upstream of the supercharger; and
determine a reverse flow, which is a flow of air from the supercharger to the side of the air flow sensor, from a change in the detected pressure by the first pressure sensor;
wherein
when determining that there is no reverse flow, calculate an intake air amount taken into a cylinder of the internal combustion engine based on the calculated throttle passage air amount; and
when determining that there is a reverse flow, calculate the intake air amount based on the pressure of air in a downstream section detected by the second pressure sensor located downstream of the throttle valve.

* * * * *